(12) United States Patent
Islam et al.

(10) Patent No.: US 10,433,283 B2
(45) Date of Patent: Oct. 1, 2019

(54) SYSTEM AND METHOD FOR BANDWIDTH DIVISION AND RESOURCE BLOCK ALLOCATION

(71) Applicant: Huawei Technologies Co., Ltd., Shenzhen (CN)

(72) Inventors: Toufiqul Islam, Ottawa (CA); Kelvin Kar Kin Au, Kanata (CA); Liqing Zhang, Ottawa (CA)

(73) Assignee: Huawei Technologies Co., LTD., Shenzhen (CN)

( * ) Notice: Subject to any disclaimer, the term of this patent is extended or adjusted under 35 U.S.C. 154(b) by 0 days.

(21) Appl. No.: 15/006,772

(22) Filed: Jan. 26, 2016

(65) Prior Publication Data

US 2017/0215170 A1 Jul. 27, 2017

(51) Int. Cl.
*H04W 4/00* (2018.01)
*H04W 72/04* (2009.01)
*H04L 27/26* (2006.01)

(52) U.S. Cl.
CPC ......... *H04W 72/04* (2013.01); *H04L 27/2601* (2013.01)

(58) Field of Classification Search
None
See application file for complete search history.

(56) References Cited

U.S. PATENT DOCUMENTS

| 8,270,435 | B2 | 9/2012 | Olszewski |
| 8,730,894 | B2 | 5/2014 | Sadri et al. |
| 9,871,607 | B1* | 1/2018 | Perets ............... H04J 1/045 |
| 2008/0232240 | A1* | 9/2008 | Baum ............... H04L 5/0007 370/210 |
| 2011/0103296 | A1 | 5/2011 | Ji et al. |
| 2011/0200004 | A1 | 8/2011 | Nakashima et al. |
| 2012/0014392 | A1 | 1/2012 | Bhushan et al. |
| 2013/0195002 | A1 | 8/2013 | Walker et al. |
| 2014/0003371 | A1* | 1/2014 | Sheu ............... H04J 1/14 370/329 |

(Continued)

FOREIGN PATENT DOCUMENTS

| CN | 102067694 A | 5/2011 |
| CN | 103516503 A | 1/2014 |

(Continued)

OTHER PUBLICATIONS

3rd Generation Partnership Project; Technical Specification Group Radio Access Network; Evolved Universal Terrestrial Radio Access (E-UTRA); Physical layer procedures (Release 12); 3GPP TS 36.213 V12.7.0, Sep. 2016.

(Continued)

*Primary Examiner* — Phirin Sam
(74) *Attorney, Agent, or Firm* — Slater Matsil, LLP

(57) ABSTRACT

Systems and apparatus for assigning sub-bands to numerologies are provided. A system bandwidth is divided into bandwidth portions, and the bandwidth portions are used as the unit of assignment for assigning sub-bands to numerologies. Systems and methods are also provided for allocating resource blocks over a bandwidth such as a sub-band. The available bandwidth is divided into sub-band portions, and the bandwidth portions are used as the unit of allocation for allocating resource blocks to user equipment.

19 Claims, 10 Drawing Sheets

(56) References Cited

U.S. PATENT DOCUMENTS

| | | | |
|---|---|---|---|
| 2014/0192745 A1* | 7/2014 | Gao | H04W 16/14 370/329 |
| 2014/0307650 A1* | 10/2014 | Vermani | H04L 5/0044 370/329 |
| 2015/0063259 A1* | 3/2015 | Gohari | H04W 28/20 370/329 |
| 2015/0085945 A1* | 3/2015 | Zhang | H04L 1/0026 375/267 |
| 2015/0208387 A1* | 7/2015 | Awad | H04W 72/042 370/329 |
| 2015/0208395 A1 | 7/2015 | Seo et al. | |
| 2015/0304146 A1 | 10/2015 | Yang et al. | |
| 2015/0365923 A1* | 12/2015 | Vermani | H04W 72/042 370/329 |
| 2016/0127952 A1* | 5/2016 | You | H04W 4/005 370/252 |
| 2016/0227522 A1* | 8/2016 | Dinan | H04L 1/00 |
| 2016/0234817 A1 | 8/2016 | Koyanagi et al. | |
| 2016/0352551 A1 | 12/2016 | Zhang et al. | |
| 2017/0005769 A1* | 1/2017 | Cho | H04L 1/1854 |
| 2017/0041938 A1* | 2/2017 | Nabar | H04W 52/04 |
| 2017/0093550 A1* | 3/2017 | Loehr | H04L 5/0098 |
| 2017/0111923 A1* | 4/2017 | Nogami | H04W 72/1263 |
| 2017/0111926 A1* | 4/2017 | Madan | H04W 72/1273 |

FOREIGN PATENT DOCUMENTS

| | | |
|---|---|---|
| CN | 104823402 A | 8/2015 |
| EP | 2136503 A2 | 12/2009 |
| JP | 2009528004 A | 7/2009 |
| JP | 2013509848 A | 3/2013 |
| JP | 2015510338 A | 4/2015 |
| JP | 2015529022 A | 10/2015 |
| WO | 2009116789 A1 | 9/2009 |
| WO | 2010050105 A1 | 5/2010 |
| WO | 2010138921 A2 | 12/2010 |
| WO | 2016004634 A1 | 1/2016 |
| WO | 2017088833 A1 | 6/2017 |

OTHER PUBLICATIONS

Xi Zhang et al. "Filtered-OFDM—Enabler for Flexible Waveform in the 5th Generation Cellular Networks", IEEE Globecom, San Diego, CA, Dec. 2015.

Zhang,Xi et al. Filtered-OFDM-Enabler for Flexible Waveform in the 5th Generation Cellular Networks Global Communications Conference (GLOBECOM). Oct. 12, 2015. pp. 1-6.

* cited by examiner

SYSTEM AND METHOD FOR BANDWIDTH DIVISION AND RESOURCE BLOCK ALLOCATION

FIELD

The application relates to a system and method for wireless communications, and in particular, to channelization for a system and method that incorporates orthogonal frequency division multiplexing (OFDM) for radio link transmissions in wireless networks.

BACKGROUND

In wireless communications networks such as Long-Term Evolution (LTE) networks, OFDM transmissions use a 15 kHz spacing between two adjacent subcarriers for most applications. A 7.5 kHz subcarrier spacing was proposed for dedicated evolved Multimedia Broadcast Multicast Service (e-MBMS) service. A given transmitter transmits using one subcarrier spacing or the other. Resource block (RB) channelization involves defining resource blocks as the unit of allocation. In LTE, a respective fixed channelization is defined for each of the 15 kHz and 7.5 kHz options; the channelization for 15 kHz employs 12 subcarriers per resource block, and the channelization for 7.5 kHz employs 24 subcarriers per resource block. The resource blocks for both channelizations have 180 kHz bandwidth (BW).

In LTE, as discussed above, a frame structure is employed that is not flexible, and fixed resource block definitions are used. RB allocation to a user equipment (UE) is performed using an RB allocation indicator bitmap. The size of the RB allocation indicator bitmap is proportional to system bandwidth. In an LTE RB allocation indicator bitmap, ones and zeros indicate which RBs are assigned to a UE, where one means assigned, zero means not assigned. LTE provides for type 0/1/2 RB allocation indicator bitmaps, all of which have a fixed size for a given bandwidth, regardless of how many RBs a UE occupies. The LTE RB allocation approach can be inefficient when different types of traffic co-exist and/or a same bitmap size is used to allocate RBs for all types of traffics within a moderate-to-large bandwidth.

SUMMARY

According to one aspect of the present invention, there is provided a method comprising: transmitting a bandwidth portion assignment to indicate at least one bandwidth portion of a plurality of bandwidth portions that is assigned to a given numerology, the given numerology having an associated OFDM subcarrier spacing and symbol duration.

According to another aspect of the present invention, there is provided a method comprising: transmitting a sub-band portion selection field to select at least one sub-band portion from a plurality of sub-band portions of at least one bandwidth portion assigned to a numerology; transmitting a resource block allocation field to indicate an allocation of resource blocks or resource block groups within the selected at least one sub-band portion.

According to still another aspect of the present invention, there is provided a method comprising: receiving a bandwidth portion assignment to indicate at least one bandwidth portion of a plurality of bandwidth portions that is assigned to a given numerology, the given numerology having an associated OFDM subcarrier spacing and symbol duration.

According to yet another aspect of the present invention, there is provided a method comprising: receiving a sub-band portion selection field to select at least one sub-band portion from a plurality of sub-band portions of at least one bandwidth portion assigned to a numerology; receiving a resource block allocation field to indicate an allocation of resource blocks or resource block groups within the selected at least one sub-band portion.

BRIEF DESCRIPTION OF THE DRAWINGS

Embodiments of the disclosure will now be described with reference to the attached drawings in which.

DETAILED DESCRIPTION

Figure 1:
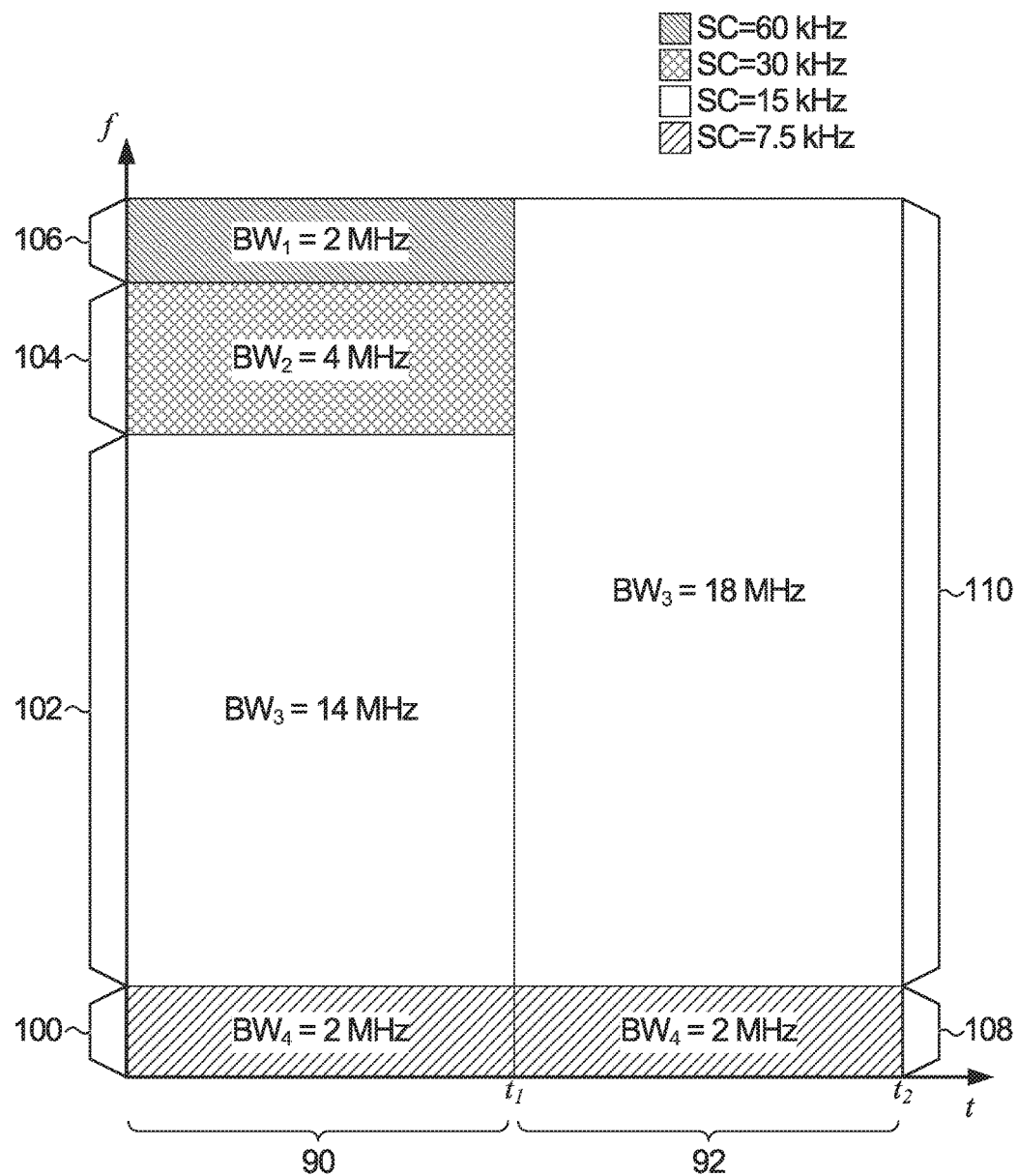
FIG. 1 depicts an example of the coexistence of differing numerologies within a system bandwidth that can change over time.

The fixed subcarrier spacing employed by LTE networks may limit applications in wireless networks, for example, in very high speed mobility scenarios (e.g., up to 500 km/h) which may incur high Doppler frequency shift, or in scenarios where high radio frequency bands are employed, such as 10 GHz bands, where phase noise may lead to large frequency shift. In such cases, the fixed 15 kHz subcarrier spacing may not be wide enough to accommodate the Doppler impact in the frequency domain. On the other hand, low cost devices employing Machine-Type Communications (MTC) or Device to Device (D2D) communications may use a narrower frequency bandwidth to enhance coverage and save energy. In such cases, subcarrier spacings can be narrower than that used in networks such as LTE. In addition, LTE may not be able to support traffic requiring very low latency, for which a shorter transmit time interval (TTI) and wider subcarrier spacing are necessary. For example, 60 kHz or 30 kHz subcarrier spacings may be better suited for low latency traffic.

Frame structures have been proposed that are flexible in terms of the use of differing numerologies. A numerology is defined in terms of subcarrier spacing and of OFDM symbol duration, and may also be defined by other parameters such as inverse fast Fourier transform (IFFT) length, TTI length, and cyclic prefix (CP) length or duration. These numerologies may be scalable in the sense that subcarrier spacings are multiples of each other as between the differing numerologies, and TTI lengths are also multiples of each other as between differing numerologies. Such a scalable design across multiple numerologies provides implementation benefits, for example scalable total OFDM symbol duration in a time division duplex (TDD) context. See also Applicant's U.S. provisional application No. 62/169,342 to Liqing Zhang et al., entitled "System and Scheme of Scalable OFDM Numerology", hereby incorporated by reference in its entirety, which provides systems and methods with scalable numerologies.

Table 1 below contains an example of a flexible frame structure design with scalable numerologies in the four columns under "Frame structure". Frames can be built using one or a combination of the four scalable numerologies. For comparison purposes, in the right hand column of the table, the conventional fixed LTE numerology is shown. In Table 1, each numerology uses a first cyclic prefix length for a first number of OFDM symbols, and a second cyclic prefix length for a second number of OFDM symbols. For example, in the first column under "Frame structure", the TTI includes 3 symbols with a cyclic prefix length of 1.04 us followed by 4 symbols with a cyclic prefix length of 1.3 us.

The first column is for a numerology with 60 kHz subcarrier spacing which also has the shortest OFDM symbol duration. This may be suitable for ultra-low latency communications, such as Vehicle-to-Any (V2X) communications, and industrial wireless control applications. The second column is for a numerology with 30 kHz subcarrier spacing. The third column is for a numerology with 15 kHz subcarrier spacing. This numerology has the same configuration as in LTE, except that there are only 7 symbols in a TTI. This may be suitable for broadband services. The fourth column is for a numerology with 7.5 kHz spacing, which also has the longest OFDM symbol duration among the four numerologies. This may be useful for coverage enhancement and broadcasting. Of the four numerologies listed, those with 30 kHz and 60 kHz subcarrier spacings are more robust to Doppler spreading (fast moving conditions), because of the wider subcarrier spacing.

TABLE 1

Example set of Numerologies

| Parameters | Frame structure | | | | Baseline (LTE) |
|---|---|---|---|---|---|
| TTI Length | 0.125 ms | 0.25 ms | 0.5 ms | 1 ms | TTI = 1 ms |
| Subcarrier spacing | 60 kHz | 30 kHz | 15 kHz | 7.5 kHz | 15 kHz |
| FFT size | 512 | 1024 | 2048 | 4096 | 2048 |
| Symbol duration | 16.67 us | 33.33 us | 66.67 us | 133.33 us | 66.67 us |
| # symbols in each TTI | 7 (3, 4) | 7 (3, 4) | 7 (3, 4) | 7 (3, 4) | 14 (2, 12) |
| CP length | 1.04 us, 1.30 us (32, 40 point) | 2.08 us, 2.60 us (64, 80 point) | 4.17 us, 5.21 us (128, 160 point) | 8.33 us, 10.42 us (256, 320 point) | 5.2 us, 4.7 us (160, 144 point) |
| CP overhead | 6.67% | 6.67% | 6.67% | 6.67% | 6.67% |
| BW (MHz) | 20 | 20 | 20 | 20 | 20 |

It should be understood that the specific numerologies of the example of Table 1 are for illustration purposes, and that a flexible frame structure combining other numerologies can alternatively be employed.

OFDM-based signals can be employed to transmit a signal in which multiple numerologies coexist simultaneously. More specifically, multiple sub-band OFDM signals can be generated in parallel, each within a different sub-band, and each sub-band having a different subcarrier spacing (and more generally with a different numerology). The multiple sub-band signals are combined into a single signal for transmission, for example for downlink transmissions. Alternatively, the multiple sub-band signals may be transmitted from separate transmitters, for example for uplink transmissions from multiple user equipments (UEs). In a specific example, filtered OFDM (f-OFDM) can be employed. With f-OFDM, filtering is employed to shape the spectrum of each sub-band OFDM signal, and the sub-band OFDM signals are then combined for transmission. f-OFDM lowers out-of-band emission and improves transmission, and addresses the non-orthogonality introduced as a result of the use of different subcarrier spacings.

In some embodiments, the resource block definitions are configurable. For example, the number of tones per RB can be varied across time and/or system bandwidth. See, for example, Applicant's co-pending U.S. application Ser. No. 14/952,983 filed Nov. 26, 2015, and entitled "Resource Block Channelization for OFDM-based Numerologies", hereby incorporated by reference in its entirety.

Depending on traffic types, traffic for a given UE may occupy only a small (e.g., VoIP packet) or large portion (e.g., video streaming) of an available bandwidth. Using the same RB allocator bitmap for UEs occupying significantly different sized portions of an available bandwidth is inefficient. In accordance with some embodiments of the invention, the size of the RB allocation bitmap can be reduced by taking into account the fact that different UEs have different payload sizes.

A first set of embodiments of the invention provide methods of decomposing a system bandwidth, for example 20 MHz, into sub-bands, and assigning one or more of the sub-bands to a numerology. When multiple sub-bands are assigned to a numerology, they may be contiguous or distributed. A second set of embodiments provide methods for efficiently allocating resource blocks within a specified bandwidth, for example one specified by one of the first set of embodiments.

As used herein, a sub-band is a contiguous range of bandwidth assigned to a numerology. Typically, a respective spectrum shaping filter is used for each sub-band. This is to be contrasted with a portion, such as a bandwidth portion or a sub-band portion, both introduced below, which on its own does not relate to spectrum shaping requirements. A system bandwidth can be divided into bandwidth portions, for example when the entire system bandwidth is within a single spectrum shaping filter. The bandwidth portions do not relate to spectrum shaping requirements. A contiguous set of one or more bandwidth portions can be used to define a sub-band. Similarly, a sub-band can be divided into one or more sub-band portions. The sub-band portions also do not relate to spectrum shaping requirements, but rather function as building blocks for an allocation of spectrum within a sub-band for RB allocation. The sub-band portions within a sub-band share a common numerology associated with the sub-band.

The assignment of sub-bands to a numerology may change over time and can be configured, although in some embodiments this allocation is static or semi-static. The size and number of sub-bands allocated to a numerology may depend on traffic types, number of users served, and corresponding payload. A further advantage of flexible sub-band assignment is to enable a future proof design that supports the independent co-existence of multiple services within the same carrier.

In FIG. 1, an example of an assignment of sub-bands to numerologies that changes over time is depicted with frequency on the vertical axis and time on the horizontal axis. During a first time period 90, an available bandwidth is divided between four OFDM sub-bands 100,102,104,106. In sub-band 100, a numerology with a 7.5 kHz subcarrier spacing is used. In sub-band 102, a numerology with a 15 kHz subcarrier spacing is used. In sub-band 104, a numerology with a 30 kHz subcarrier spacing is used. In sub-band 106, a numerology with a 60 kHz subcarrier spacing is used. The bandwidth division changes such that at time $t_1$, a new division is assigned. During a second time period 92, an available bandwidth is divided between two OFDM sub-bands 108,110. In sub-band 108, a numerology with a 7.5 kHz subcarrier spacing is used. In sub-band 110, a numerology with a 15 kHz subcarrier spacing is used. In the example of FIG. 1, a single sub-band is assigned to each numerology. In some embodiments, multiple distributed sub-bands can be assigned to a numerology.

Numerology Assignment and Sub-Band Bandwidth Assignment to Numerologies

In some embodiments, the numerology to be used for communications with a particular UE is preset and does not need to be signalled. In other embodiments, a UE supports multiple numerologies, and the network (typically a base station) signals to the UE which numerology to use.

An embodiment of the invention provides a mechanism of flexibly assigning portions of an available system bandwidth, referred to above as sub-bands, to a numerology, and conveying this assignment to a UE.

In some embodiments, higher layer radio resource control (RRC) signaling is used for one or both of numerology assignment and sub-band bandwidth assignment to an assigned numerology. This would be appropriate, for example, if dynamically changing the assignment is not desired. This approach has a relatively low overhead. In some embodiments, dynamic signaling, for example on a dynamic control channel, is used for one or both of numerology assignment and sub-band bandwidth assignment to an assigned numerology. This approach would be appropriate, for example, if there is a requirement to be able to quickly and dynamically change the assignment. This approach has a relatively higher overhead.

Figure 2:
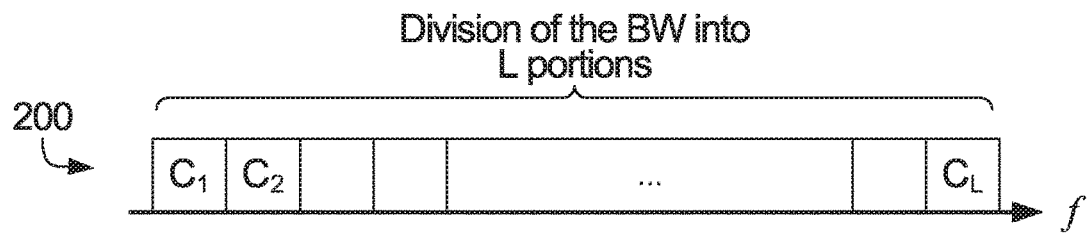
FIG. 2 is an example of a how a system bandwidth can be decomposed into fixed sized bandwidth portions.

In some embodiments, for the purpose of sub-band assignment, a system bandwidth is decomposed into a set of fixed equal size bandwidth portions. An example is depicted in FIG. 2 generally indicated at 200, where an available bandwidth is shown divided into L equal sized bandwidth portions. The portions are then available for allocation to numerologies.

Figure 3:
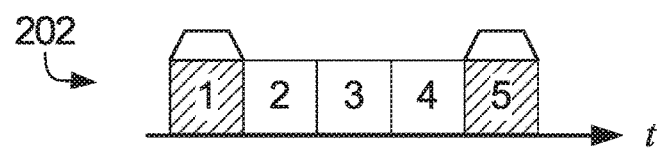
FIG. 3 is an example of how distributed bandwidth portions can be assigned to a numerology.

In some embodiments, by defining a set of L bandwidth portions, a fully flexible assignment of the bandwidth portions to a given numerology is supported, meaning that an arbitrary combination of one or more bandwidth portions can be assigned to a given numerology. In this case, the bandwidth portions assigned to a given numerology may be distributed or contiguous. L bits of signaling can be used to convey the assignment of any combination of bandwidth portions to a numerology. If a set of distributed portions is assigned to a numerology, each distinct portion or group of bandwidth portions is a respective sub-band, and separate OFDM processing is required for each sub-band. An example of this approach is depicted in FIG. 3 generally indicated at 202, where a bandwidth of 100 MHz is divided into L=5 bandwidth portions of 20 MHz each, and bandwidth portions 1 and 5 are allocated to a particular numerology. In this case, separate OFDM processing is required for each of the two bandwidth portions. Five signaling bits can be used to convey the assignment of any combination of the five bandwidth portions to a numerology. For example, "10001" could convey the assignment of the first and fifth bandwidth portions to a numerology. The remaining bandwidth portions may be assigned to one or more other numerologies.

In some embodiments, contiguous assignment of bandwidth portions to a given numerology is supported. In this case, the available bandwidth is divided into L bandwidth portions, and a set of one or more contiguous bandwidth portions are assigned to a first numerology. Remaining bandwidth portions may be assigned to other numerologies. In this case, a signaling scheme that is specific to identifying a set of contiguous bandwidth portions can be employed that is more efficient than the fully flexible scheme described above. In a specific example, $\log_2(L(L+1))-1$ bits of signaling are sufficient to convey the assignment of a contiguous group of bandwidth portions to a numerology. Here the bitmap for sub-band division is smaller than the number of bandwidth portions available. For example, an allocation of three adjacent portions {2 3 4} out of 5 portions shown in FIG. 3, is one choice from all the possible $\log_2(5(5+1))-1$ choices, for which a 4 bit bitmap can be employed. Example of possible contiguous selections: {12345, 1234, 123, 12, 1, 2345, 234, 23, 2, 345, 34, 3, 45, 4, 5}. In a specific example, this set of possible contiguous selections is mapped to a 4-bit bitmap, starting from 0001, with the result that 0110 can be used to indicate the sequence for {2 3 4}.

An example of this approach is depicted in FIG. 3 where a bandwidth of 100 MHz is divided into L=5 bandwidth portions of 20 MHz each, and contiguous bandwidth portions 2, 3 and 4 are allocated to a particular numerology. In this case, the three contiguous bandwidth portions 2, 3 and 4 can be processed with a common filter or spectral mask.

In some embodiments, both a signaling scheme for the fully flexible assignment of bandwidth portions, and a signaling scheme for the assignment of contiguous groups of bandwidth portions are supported.

The choice of L is a trade-off between flexibility and overhead. A larger value of L gives more flexibility at the cost of increased overhead. However, this signaling may be done semi-statically in which case the overhead impact of a larger L is reduced compared to more dynamic signaling where the signaling is inserted in every TTI control signal.

In another embodiment, the available bandwidth is divided into a set of bandwidth portions that may be equal or non-equal, in accordance with one of a set of predefined patterns. Each pattern defines a division of an available bandwidth into a predefined set of bandwidth portions of varying sizes. These patterns can be established based on traffic statistics served by different numerologies. For example, a pattern can be defined having one or more smaller bandwidth portions and one or more larger bandwidth portions. The smaller bandwidth portions can be assigned to an appropriate numerology for smaller payload traffic such as (MTC) traffic (short packet), and the larger bandwidth portions can be assigned to an appropriate numerology for larger payload traffic such as mobile broadband (MBB). The number of smaller bandwidth portions and the number of larger bandwidth portions for a given pattern can be chosen to correspond to a desired or expected balance in traffic between the smaller payload traffic and the larger payload traffic.

The same or different patterns can be used for different system bandwidth choices, e.g., 10, 20, 100 MHz etc.

Figure 4A:
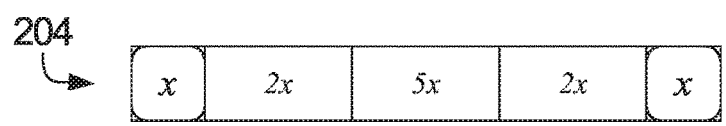
FIGS. 4A and 4B are two example patterns of unequal bandwidth portions.

A first example pattern 204 is depicted in FIG. 4A where an available bandwidth is divided into 5 bandwidth portions of size x, 2x, 5x, 2x and x, where x is the size of the smallest portion.

Figure 4B:
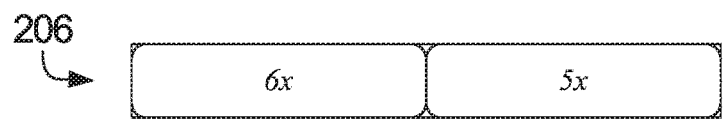

A second example pattern 206 is depicted in FIG. 4B where an available bandwidth is divided into 2 portions of size 6x and 5x.

If there are D predefined patterns, $\log_2 D$ bits can be used to signal the identity of a specific one of the patterns.

Having defined a set of D predefined patterns of bandwidth portions, either of the two bandwidth portion assignment schemes described above can be used to convey bandwidth portion assignments for a given numerology. For example, $\log_2 D+L$ bits can be used to identify a specific pattern and assign an arbitrary combination of the L bandwidth portions to a numerology, or $\log_2 D+\log_2(L(L+1))-1$ bits can be used to identify a specific pattern and assign a contiguous set of bandwidth portions to a numerology. This method may require less signaling compared to the equal-size bandwidth portion based approach described above.

In a particular example, for the pattern 204 of FIG. 4A, the two portions on the edge of the bandwidth with size x might be assigned to a numerology suitable for MTC traffic, and the remaining portions with size 2x,5x,2x might be assigned to a numerology suitable for MBB traffic.

Systems and Methods of RB Allocation

RB allocation is the process of defining which resource blocks are to be used for traffic for which UE, and transmitting signaling to UEs indicating their resource blocks.

As noted previously, in LTE, the RB allocation bitmap has a fixed size for the allotted system bandwidth. The same fixed size bitmap is used to allocate small payload traffic (e.g. 1-2 RBs) and large payload traffic (e.g. 20-30 RBs). This conventional fixed size bitmap approach offers maximum flexibility for scheduling resource block groups (RBGs) or RBs anywhere in the bandwidth and also allows for the best possible frequency diversity.

However, in many cases, the best possible frequency diversity is not required and/or the channel may be only moderately frequency selective and/or the UE may need to be scheduled over only a small portion of the available bandwidth. A given UE may not need to be scheduled over all of the available bandwidth.

In some embodiments, one or more sub-bands are collectively assigned to a given numerology. The assigned sub-bands may be contiguous or non-contiguous. The assignment of sub-bands to a numerology may be signaled to UEs by, for example, using one of the approaches described above. In addition, the numerology for a given UE is either predefined, or previously signalled, as described previously. In some embodiments, instead of assigning sub-bands a set of one or more bandwidth portions can be assigned to a numerology. The bandwidth portions can be assigned using the bandwidth portion methodology described previously, or some other method. The sub-band assignment approach and the bandwidth portion assignment approach will be described in further detail below with reference to FIGS. 5A to 5E.

For RB allocation, in some embodiments, a bandwidth portion selection field is used to indicate which bandwidth portions assigned to a numerology will be used for a given UE. In some embodiments, instead of using a bandwidth portion selection field, a sub-band selection field is used to indicate which sub-bands assigned to a numerology will be used for a given UE. In either case, an RB allocation field indicates RB allocation within a specified bandwidth. In some embodiments, both approaches are supported and can be applied on a per-UE basis. The bandwidth portion selection field and the sub-band selection approach will be described in further detail below with reference to FIGS. 6A to 6C.

Sub-Band Selection

Figure 5A:
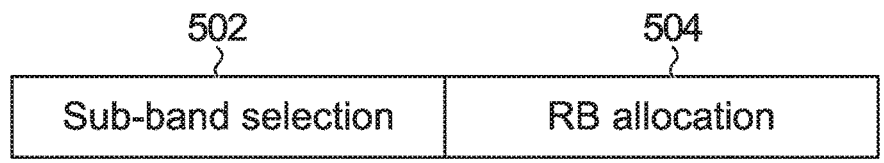
FIG. 5A is an example structure of a signaling message containing a sub-band selection field and an RB allocation field.
Figure 5B:
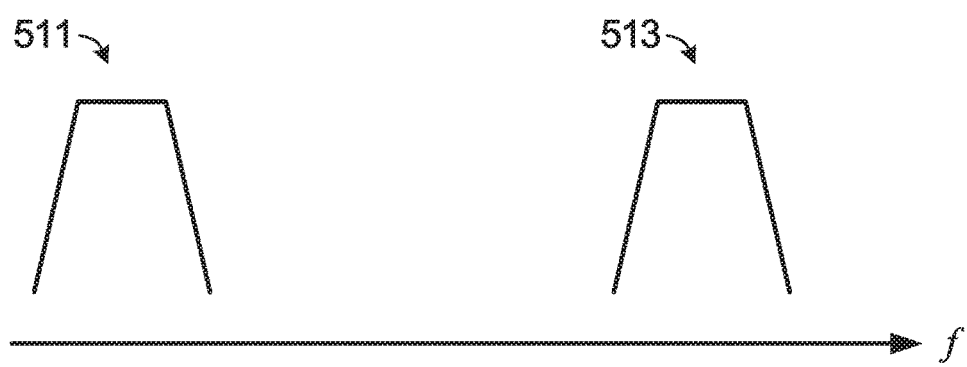
FIGS. 5B, 5C are examples showing the selection of sub-bands, for example using the message structure of FIG. 5A.

Referring to FIG. 5A, an example of a message contains two fields, a sub-band selection field 502 and an RB allocation field 504, to convey the RB allocation to the UE. Referring now to FIG. 5B, shown is an example in which a numerology with 7.5 KHz sub-carrier spacing for MTC traffic is assigned two sub-bands 511,513 on the edges of an available bandwidth. For a UE to be able to receive on both sub-bands 511,513, separate OFDM processing is required, which can be costly for the UE. More specifically, because there may be an allocation of sub-bands to other users and/or numerologies, between the assigned sub-bands on the edges, a UE will need to separately filter out a part of the bandwidth containing each sub-band.

For the example of FIG. 5B, a sub-band selection field can be used in the form of a two bit field set to "10" indicating that the first sub-band 511 is selected and the second sub-band 513 is not selected. This means that RBs will be allocated to the particular UE within the first sub-band 511.

Figure 5C:
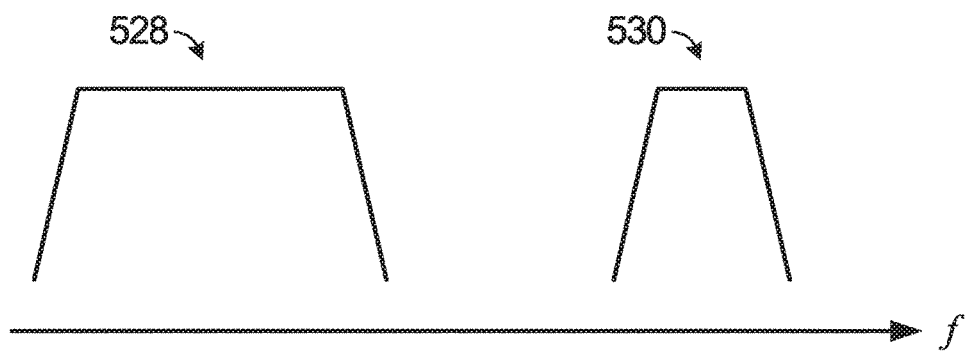

Referring now to FIG. 5C, shown is an example in which a numerology with 7.5 KHz sub-carrier spacing for MTC traffic is assigned a first sub-band 528 and a second sub-band 530. A sub-band selection field can be used in the form of a two bit field set to "10" indicating that the first sub-band 528 is selected and the second sub-band 530 is not selected. This means that RBs will be allocated to the particular UE within the second sub-band.

It should be understood that the sub-band portion selection field is not limited to the specific format described, wherein each sub-band has a respective bit. Returning to FIG. 5B, for the most flexibility, a two-bit field as described above can be used to indicate whether a given UE is scheduled over one or both sub-bands. For reduced signaling overhead, a single bit field can be used to indicate which of the two sub-bands the UE is being scheduled over.

Bandwidth Portion Selection

Figure 5D:
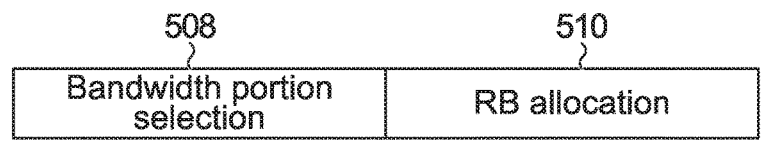
FIG. 5D depicts an example structure of a signaling message containing a bandwidth portion selection field and an RB allocation field.

Referring to FIG. 5D, shown is a second example of a message having a bandwidth portion selection field 508 and an RB allocation field 510, to convey the RB allocation to the UE.

Figure 5E:
FIGS. 5E, 5F and 5G are examples showing the selection of bandwidth portions, for example using the message structure of FIG. 5D.

Referring now to FIG. 5E shown is an example in which a numerology with 7.5 KHz sub-carrier spacing for MTC traffic is assigned two bandwidth portions on the edges of an available bandwidth.

For this example, the bandwidth portion selection field indicates a subset of the bandwidth portions assigned to the numerology for MTC traffic, namely the numerology to which the particular UE is assigned. In the example, the bandwidth portion selection field is a two bit field set to "10" indicating that the first bandwidth portion is selected and the second bandwidth portion is not selected. This means that RBs will be allocated to the particular UE within the first bandwidth portion.

Figure 5F:
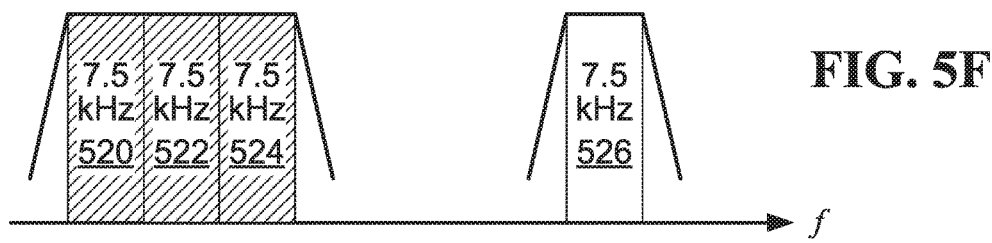

Referring now to FIG. 5F, shown is an example in which a numerology with 7.5 KHz sub-carrier spacing for MTC traffic is assigned a set of three contiguous bandwidth portions 520,522,524 and a non-contiguous bandwidth portion 526. Alternatively, the numerology is assigned a first sub-band 528 and a second sub-band 530. For this example, the bandwidth portion selection field indicates a subset of the bandwidth portions assigned to the numerology for MTC traffic, namely the numerology to which the particular UE is assigned. In the example, the bandwidth portion selection field is a four bit field set to "1110" indicating that the first, second and third bandwidth portions 520,522,524 are selected and the fourth bandwidth portion 526 is not selected. This means that RBs will be allocated to the particular UE within the first, second and third bandwidth portions.

Figure 5G:
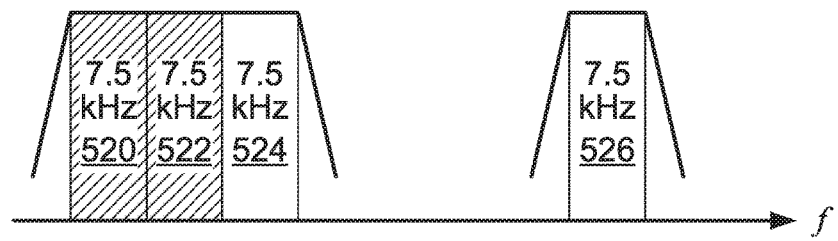

Another example of bandwidth portion selection is depicted in FIG. 5G, where the same bandwidth portion assignment FIG. 5F is employed. In this case, the bandwidth portion selection field is a four bit field set to "1100" indicating that the first and second bandwidth portions 520,522 are selected, and that third and fourth bandwidth portions 524,526 are not selected. This means that RBs will be allocated to the particular UE within the first and second bandwidth portions.

It should be understood that the bandwidth portion selection field is not limited to the specific format described wherein each bandwidth portion has a respective bit. Returning to the Example of FIG. 5E, for the most flexibility a two-bit field as described above can be used to indicate whether a given UE is scheduled over one or both bandwidth portions. For reduced flexibility, a single bit field can be used to indicate which of the two sub-bands the UE is being scheduled over.

Sub-Band Portion Selection

Figure 6A:
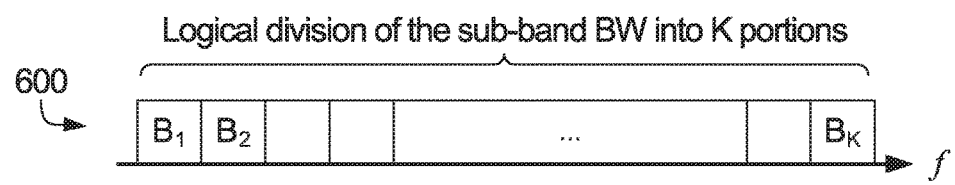
FIG. 6A is an example of how a bandwidth portion can be decomposed into sub-band portions.

In some embodiments, a frequency resource, for example bandwidth portions selected with the bandwidth portion selection field described above or the sub-bands selected with the sub-band selection field described above, is divided into sub-band portions. This is similar to how an available bandwidth is divided into bandwidth portions in the previously described embodiment. The selected bandwidth portions or sub-bands may be divided into K sub-band portions. K is a design parameter that represents a trade-off between scheduling flexibility and overhead. The choice of K may be influenced by the types of UEs served under a numerology. An example is depicted in FIG. 6A where a frequency resource 600 is divided into K sub-band portions $B_1$, $B_2, \ldots, B_K$. The sub-band portion selection field selects one or more of the K sub-band portions. K bits would be needed to support arbitrary selection of any combination of the K sub-band portions, whereas $\log_2(K(K+1))-1$ bits could be used to select a contiguous combination of the K sub-band portions.

Figure 6B:
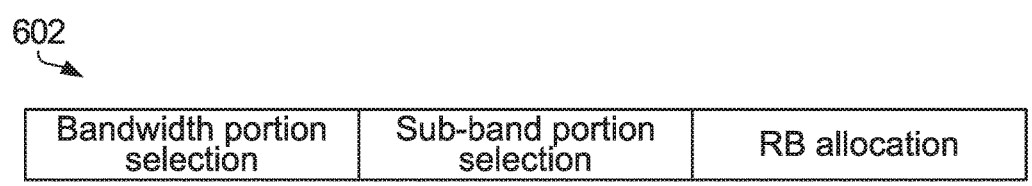
FIG. 6B depicts an example structure of a signaling message containing a bandwidth portion selection field, a sub-band portion selection field, and an RB allocation field.

An example of a message format 602 is depicted in FIG. 6B, which shows three fields used to convey the RB allocation to the UE. The first field is the previously described bandwidth portion selection field. The second field is a sub-band portion selection field that indicates one or more of the sub-band portions within the selected bandwidth portion. The third field is an RB allocation field, which allocates resource blocks across the sub-band portions selected by the sub-band portion selection field.

Figure 6C:
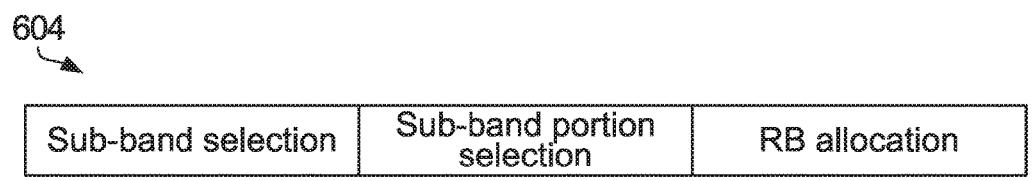
FIG. 6C depicts an example structure of a signaling message containing a sub-band selection field, a sub-band portion selection field, and an RB allocation field.

Another example of a message format 604 is depicted in FIG. 6C. A first field is the previously described sub-band selection field. The second field is a sub-band portion selection field that indicates one or more of the sub-band portions within the selected bandwidth portion. The third field is an RB allocation field, which allocates resource blocks across the sub-band portions selected by the sub-band portion selection field.

In some embodiments, a bandwidth portion selection field is used to indicate which bandwidth portions assigned to a numerology will be used for a given UE. Alternatively, in some embodiments, a sub-band selection field is used to indicate which sub-bands assigned to a numerology will be used for a given UE. In either case, an RB allocation field indicates RB allocation within a specified bandwidth.

In some embodiments, the division of resources is performed on a logical basis using logical sub-band portions, meaning each logical sub-band portion can be associated with a physically contiguous or non-contiguous physical sub-band portion. Logical division of sub-band bandwidth can be configured for efficient resource allocation, especially for moderate to larger bandwidths. Allocation of a set of physically non-contiguous sub-band portions can be done by allocating a contiguous set of logical portions. For example, logical portions 1,2,3,4,5,6,7,8 may be associated with physical portions 1,3,5,7,2,4,6,8. In this case, allocating the set of contiguous logical portions 1 to 4 will allocate non-contiguous physical portions 1,3,5,7.

Figure 7A:
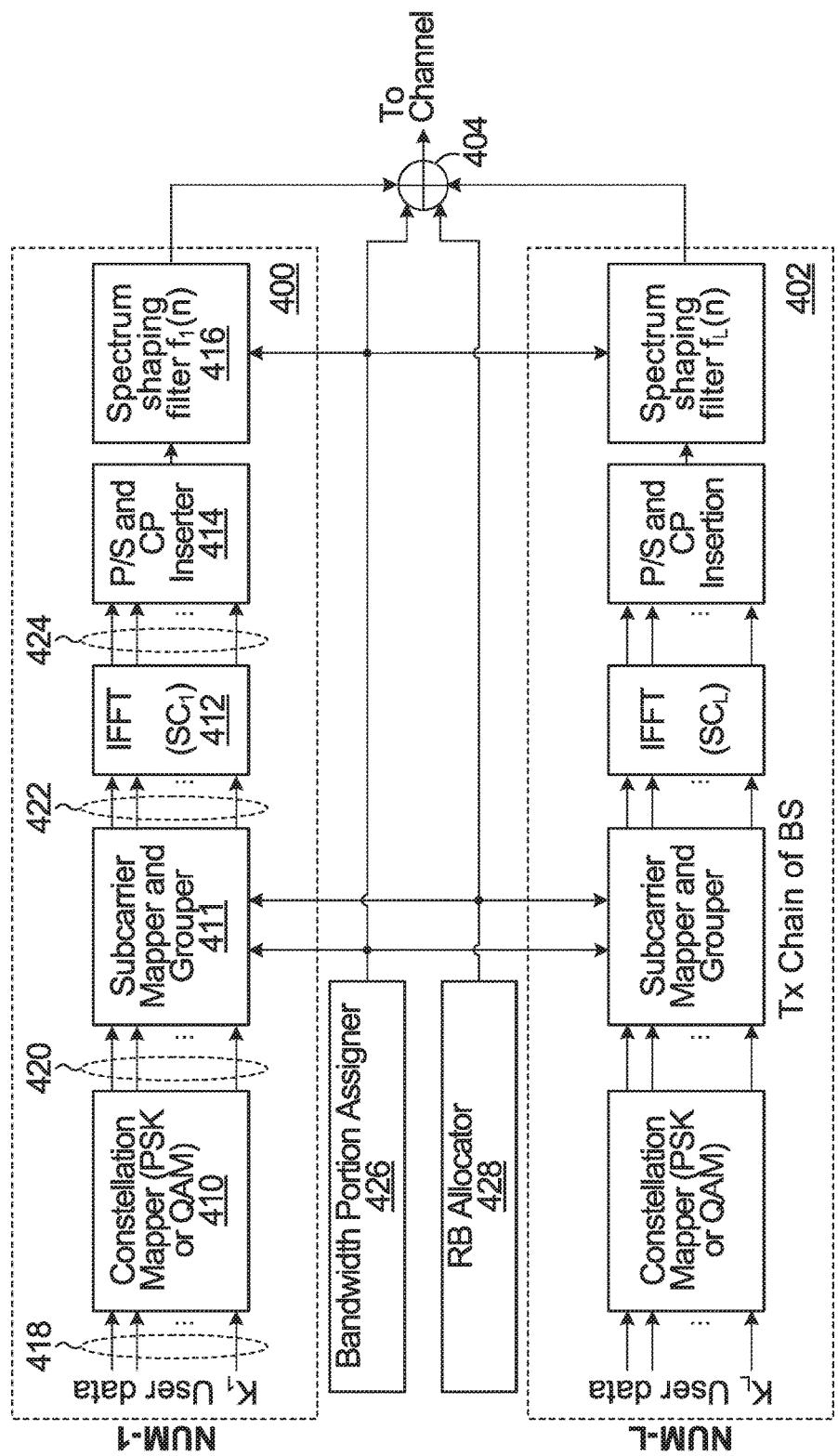
FIG. 7A is a simplified block diagram of a transmitter that can transmit resource blocks allocated using the described RB allocation.

Referring now to FIG. 7A, shown is an example simplified block diagram of part of a transmitter that can be used to transmit resource blocks allocated as described above. In this example, there are L supported numerologies, where L>=2.

Figure 7B:
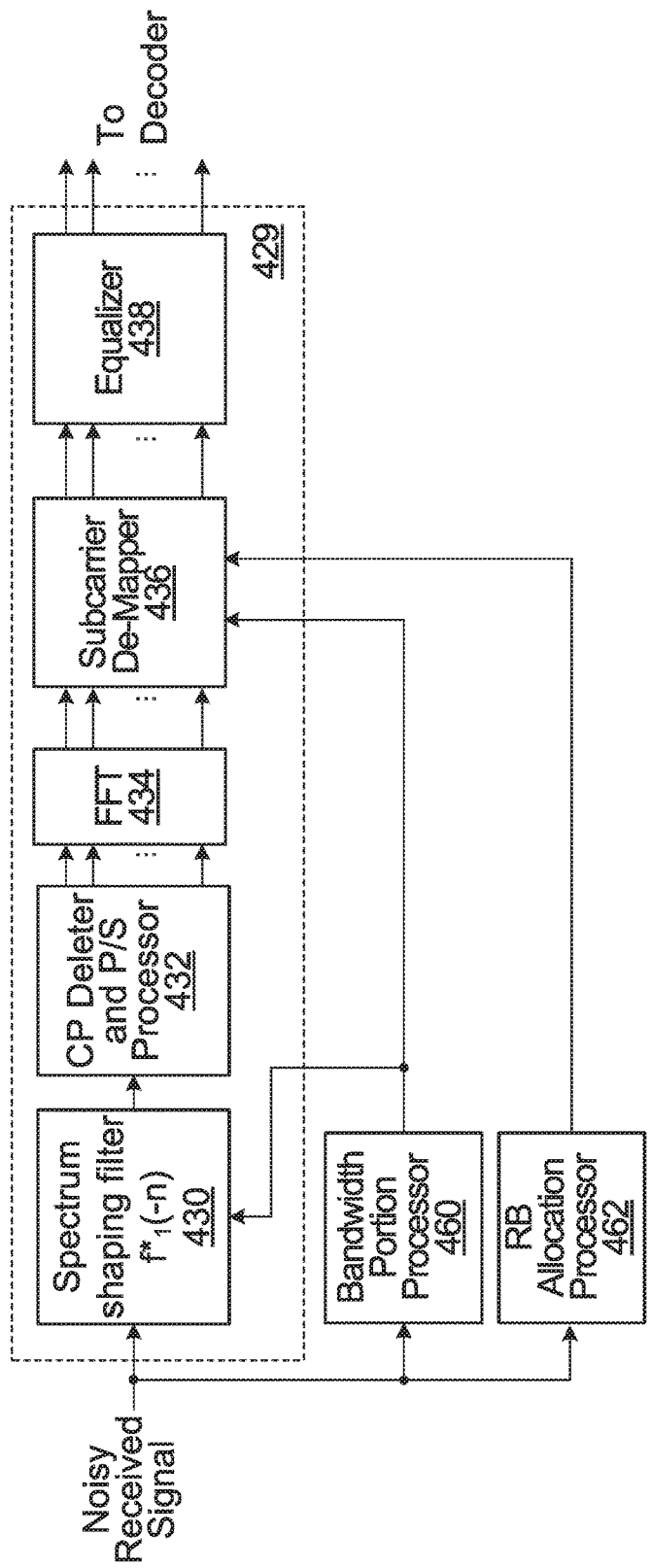
FIG. 7B is a simplified block diagram of a receiver that can receive resource blocks allocated using the described RB allocation.

For each numerology, there is a respective transmit chain 400,402. FIG. 7A shows simplified functionality for the first and Lth numerology; the functionality for other numerologies would be similar. Also shown in FIG. 7B is simplified functionality for a receive chain 429 for a receiver operating using the first numerology.

The transmit chain 400 for the first numerology includes a constellation mapper 410, subcarrier mapper and grouper 411, IFFT 412 with subcarrier spacing $SC_1$, pilot symbol (P/S) and cyclic prefix inserter 414, and spectrum shaping filter 416. In operation, constellation mapper 410 receives user data (more generally, user content containing data and/or signalling) for $K_1$ users, where $K_1 >= 1$. The constellation mapper 410 maps the user data for each of the $K_1$ users to a respective stream of constellation symbols and outputs the streams of constellation symbols 420. The number of user bits per symbol depends on the particular constellation employed by the constellation mapper 410. In the example of 4-quadrature amplitude modulation (4-QAM), 2 bits from for each user are mapped to a respective QAM symbol.

For each OFDM symbol period, the subcarrier mapper and grouper 411 groups and maps the constellation symbols produced by the constellation mapper 410 to up to P inputs of the IFFT 412 at 422. The grouping and mapping is performed based on scheduler information, which in turn is based on channelization and resource block assignment, in accordance with a defined resource block definition and allocation for the content of the $K_1$ users being processed in transmit chain 400. P is the size of the IFFT 412. Not all of the P inputs are necessarily used for each OFDM symbol period. The IFFT 412 receives up to P symbols, and outputs P time domain samples at 424. Following this, in some implementations, time domain pilot symbols are inserted and a cyclic prefix is added in block 414. The spectrum shaping filter 416 applies a filter $f_1(n)$ which limits the spectrum at the output of the transmit chain 400 to prevent interference with the outputs of other transmit chains such as transmit chain 402. The spectrum shaping filter 416 also performs shifting of each sub-band to its assigned frequency location.

The functionality of the other transmit chains, such as transmit chain 402, is similar. The outputs of all of the transmit chains are combined in a combiner 404 before transmission on the channel.

Also shown is a bandwidth portion assigner 426 that performs bandwidth assignment, for example using one of the methods described herein. The output of the bandwidth assigner 426 is passed to the subcarrier mapper and grouper 411 and the spectrum shaping filter 416. In addition, a signal carrying the bandwidth portion assignment is conveyed to combiner 404 before transmission on the channel.

Also shown is an RB allocator 428 that performs RB allocation, for example using one of the methods described herein. The output of the resource block allocator is passed to the subcarrier mapper and grouper 411. In addition, a signal carrying the RB allocation is conveyed to combiner 404 before transmission on the channel.

FIG. 7B shows a simplified block diagram of a receive chain for a UE operating with the first numerology depicted at 429. In some embodiments, a given user equipment is permanently configured to operate with a particular numerology. In some embodiments, a given UE operates with a configurable numerology. In either case, flexible resource block definitions are supported by the UE. The receive chain 429 includes spectrum shaping filter 430, cyclic prefix deleter and pilot symbol processor 432, fast Fourier transform (FFT) 434, subcarrier de-mapper 436 and equalizer 438. Each element in the receive chain performs corresponding reverse operations to those performed in the transmit chain. The receive chain for a UE operating with another numerology would be similar.

The subcarrier mapper and grouper block 411 of FIG. 7A groups and maps the constellation symbols based on the resource block definitions and scheduling. Once a resource block definition for a given user is established, RB allocation or scheduling is used to decide where in time and frequency the user's resource blocks will be transmitted. Any of the methods described previously for RB allocation can be used here.

Also shown is a bandwidth portion processor 460 that processes a signal containing a bandwidth assignment received over the air, for example using one of the methods described herein. The output of the bandwidth portion processor 460 is passed to the spectrum shaping filter 430 and the subcarrier de-mapper 436.

Also shown is an RB allocation processor 462 that processes a signal containing an RB allocation received over the air, for example using one of the methods described herein. The output of the RB allocation processor 462 is passed to the subcarrier de-mapper 436

Various options for applying one or a combination of the above-described embodiments will be described with reference to the flowcharts of FIGS. 8A to 8F. In the flowcharts that follow, one or more of pattern selection, bandwidth portion assignment, bandwidth portion selection, sub-band selection, and RB allocation may, for example, be performed using one of the methods described previously.

Figure 8A:
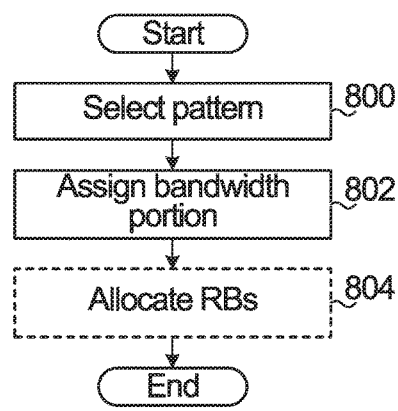
FIGS. 8A to 8F are flowcharts of methods of assigning frequency resources to a numerology and allocating resource blocks to a UE.

FIG. 8A is a flowchart of a first method of assigning a bandwidth portion to a numerology. The method begins in block 800 with selecting a pattern from a set of possible patterns. Then, in block 802, a bandwidth portion from the pattern is assigned to a numerology. In some embodiments, RBs are allocated over the assigned bandwidth at block 804.

Figure 8B:
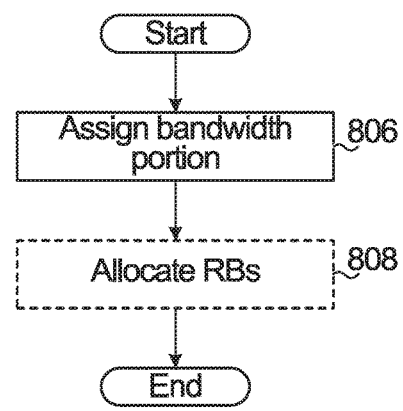

FIG. 8B is a flowchart of a second method of assigning a bandwidth portion to a numerology. In this there is a fixed pattern of bandwidth portions that is used. In block 806, a bandwidth portion is assigned to a numerology. In some embodiments, RBs are allocated over the assigned bandwidth at block 808.

Figure 8C:
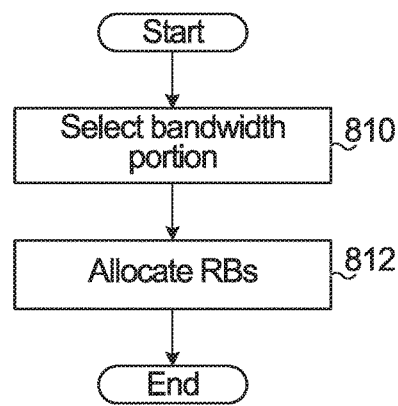

FIG. 8C is a flowchart of a first method of RB allocation to a UE. The method begins with selecting a bandwidth portion in block 810. In block 812, resource blocks are allocated over the selected bandwidth portions.

Figure 8D:
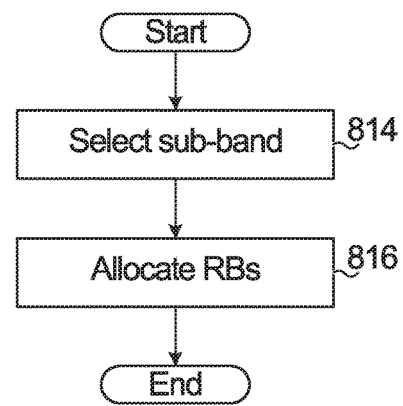

FIG. 8D is a flowchart of a second method of RB allocation to a UE. The method begins with selecting a sub-band in block 814. In block 816 resource blocks are allocated over the selected sub-band.

Figure 8E:
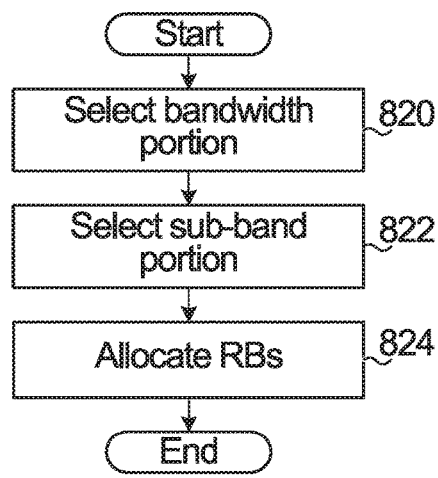

FIG. 8E is a flowchart of a third method of RB allocation to a UE. The method begins with selecting a bandwidth portion in block 820. In block 822 a sub-band portion is selected. In block 824, resource blocks are allocated over the selected sub-band portions.

Figure 8F:
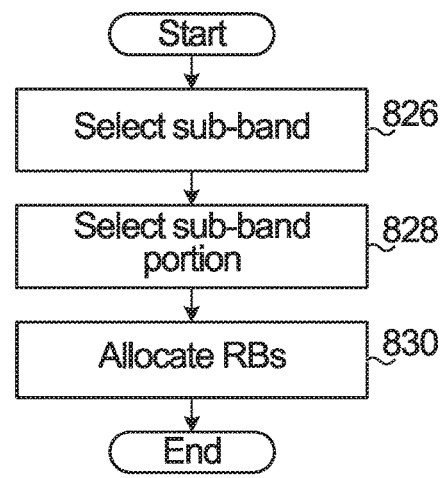

FIG. 8F is a flowchart of a second method of RB allocation to a UE. The method begins with selecting a sub-band in block 826. In block 828 a sub-band portion is selected. In block 830 resource blocks are allocated over the selected sub-band portions.

Any of the methods of FIGS. 8C to 8F may be implemented on a standalone basis, or in combination with one of the methods of FIGS. 8A and 8B.

Example Bitmaps for RB Allocation Field

The allocation of RBs within the bandwidth specified by one or more of the mechanisms described herein can be performed in any suitable manner. Where a bitmap is used to perform RB allocation, in general, the smaller the specified bandwidth, the smaller the size of the bitmap. Because of this, a UE centric approach can be used in which for differing UEs, different size bandwidths can be specified, with the result that less overhead is needed to convey the RB allocation to a UE for which a smaller bandwidth is specified.

For example, one of the methods provided by LTE can be used, as summarized in table 9.4

TABLE 9.4

Methods for indicating Resource Block (RB) allocation.

| Method | UL/DL | Description | Number of bits required (see text for definitions) |
|---|---|---|---|
| Direct bitmap | DL | The bitmap comprises 1 bit per RB. This method is the only one applicable when the bandwidth is less than 10 resource blocks. | $N_{RB}^{DL}$ |
| Bitmap: 'Type 0' | DL | The bitmap addresses Resource Block Groups (RBGs), where the group size (2, 3 or 4) depends on the system bandwidth. | $\lceil N_{RB}^{DL}/P \rceil$ |
| Bitmap: 'Type 1' | DL | The bitmap addresses individual RBs in a subset of RBGs. The number of subsets (2, 3, or 4) depends on the system bandwidth. The number of bits is arranged to be the same as for Type 0, so the same DCI format can carry either type of allocation. | $\lceil N_{RB}^{DL}/P \rceil$ |
| Contiguous allocations: 'Type 2' | DL or UL | Any possible arrangement of contiguous RB allocations can be signalled in terms of a starting position and number of RBs. | $\lceil \log_2(N_{RB}^{DL}(N_{RB}^{DL} + 1)) \rceil$ or $\lceil \log_2(N_{RB}^{UL}(N_{RB}^{UL} + 1)) \rceil$ |

Various specific examples of the RB allocation field will now be described. In a first example, the bandwidth portion assigned to a numerology support the simultaneous allocation $N_{RB}^{DL}$ resource blocks. For example, if the bandwidth portions are 1000 sub-carriers wide, and each resource block is 10 subcarriers, $N_{RB}^{DL}$ is 100. Dividing the bandwidth portion into K sub-band portions has the effect of dividing the 100 resource blocks into K groups of resource blocks, one group per sub-band portion. In some embodiments, sub-band portion selection selects M sub-band portions out of K for use in RB allocation to a given UE. After this is done, RB allocation is performed among M/K $N_{RB}^{DL}$ resource blocks. Optionally, RBG allocation can be done over this set of resource blocks. In some embodiments, the size of an RBG increases when more RBs are available for scheduling. To select an arbitrary combination of sub-band portions requires up to K bits.

In some embodiments, sub-band portion selection selects a single sub-band portion out of K for use in RB allocation to a given UE. After this is done, RB allocation is performed among the $N_{RB}^{DL}/K$ resource blocks. To select a single sub-band portion requires up to $\log_2 K$ bits.

This method can provide savings in overhead when the number of resource blocks M allocated for a given UE is significantly smaller than K (M<<K). In cases of a large payload when full sub-band allocation is required, RB allocation can be based a whole bandwidth portion.

Figure 9:
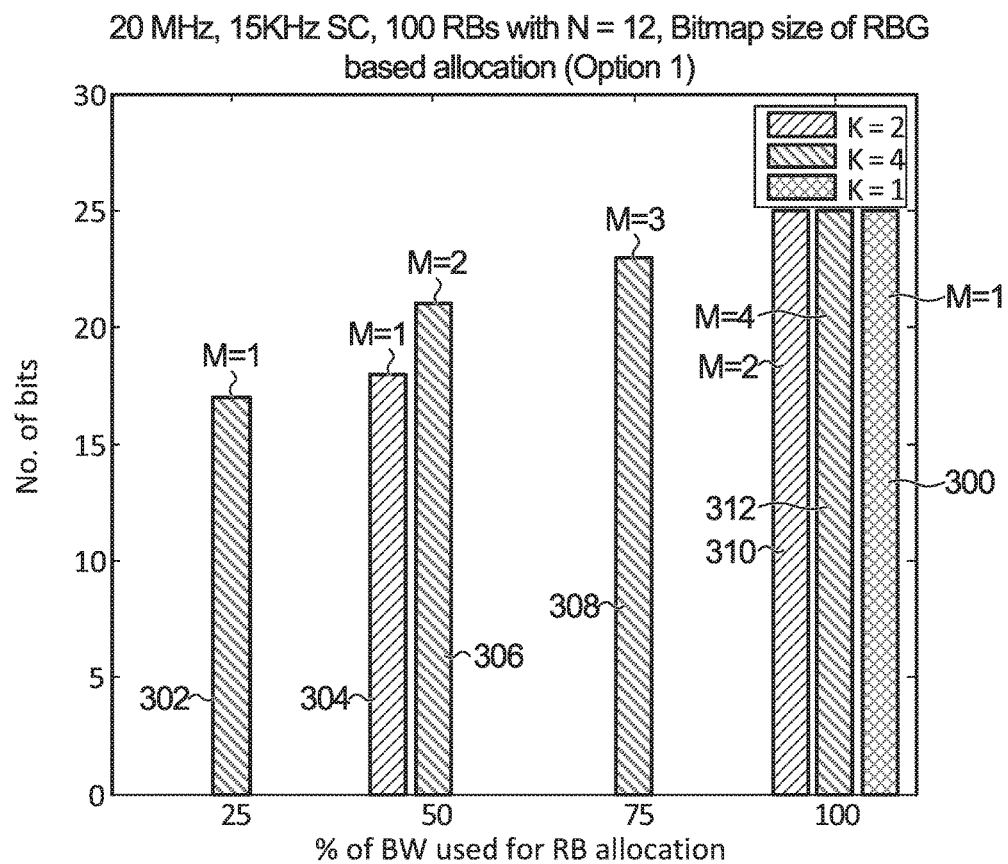
FIG. 9 is a chart comparing overhead for various signaling schemes.

An example overhead comparison is shown in FIG. 9. This compares the overhead for using K=2 sub-band portions and K=4 sub-band portions to not using sub-band portion assignment, (i.e. K=1). Along the horizontal axis is the percentage of bandwidth used for RB allocation. In this example, there is 20 MHz of bandwidth, and a subcarrier spacing of 15 kHz. Resource blocks with 12 subcarriers are used. A sub-band portion selection field is used to select M out of K sub-band portions, and RB allocation is performed using RBGs.

For K=1, 100% of the bandwidth is used for RB allocation, and the overhead for that scenario is indicated at 300. This approach is consistent with the LTE approach.

For K=4,M=1, 25% of the sub-band portions are used for RB allocation, and the overhead is indicated at 302.

For K=2,M=1, 50% of the sub-band portions are used for RB allocation, and the overhead is indicated at 304.

For K=4,M=2, 50% of the sub-band portions are used for RB allocation, and the overhead is indicated at 306.

For K=4,M=3, 75% of the sub-band portions are used for RB allocation, and the overhead is indicated at 308.

For K=2,M=2, 100% of the sub-band portions are used for RB allocation, and the overhead is indicated at 310.

For K=4,M=4, 100% of the sub-band portions are used for RB allocation, and the overhead is indicated at 312.

As expected, when M<<K, fewer bits are required.

In some embodiments, sub-band division is performed dynamically. In other embodiments, there may be a static or semi-static sub-band division. If sub-band division is not dynamic, then UEs are assigned particular sub-bands for longer time horizon semi-statically, and conveying this information may be done separately from sub-band portion selection and RB allocation which can, for example be sent using a Physical Downlink/Uplink Control channel (PDCCH or PUCCH) which may be part of every TTI and may appear in the first few OFDM symbols of the TTI.

Numerous modifications and variations of the present disclosure are possible in light of the above teachings. It is therefore to be understood that within the scope of the appended claims, the disclosure may be practiced otherwise than as specifically described herein.

We claim:

1. A method comprising:
    transmitting a bandwidth portion assignment to indicate an assignment of at least one first bandwidth portion of a plurality of bandwidth portions within an available bandwidth to a given first numerology, the given first numerology having an associated first OFDM subcarrier spacing and first symbol duration, the plurality of bandwidth portions having at least one second bandwidth portion that is assigned to a second numerology, the second numerology having an associated second OFDM subcarrier spacing and second symbol duration, and the first OFDM subcarrier spacing differing from the second OFDM subcarrier spacing by a factor of $2^n$, where n≠0.

2. The method of claim 1 further comprising:
    transmitting a resource block allocation field to indicate an allocation of resource blocks within the indicated at least one bandwidth portion assigned to the given numerology.

3. The method of claim 2 wherein transmitting a resource block allocation field comprises transmitting a resource block allocation field that has a size that is proportional to a size of a bandwidth over which resource block allocation is performed.

4. The method of claim 1 wherein transmitting a bandwidth portion assignment comprises using a signalling scheme that is fully flexible such that an arbitrary combination of the plurality of bandwidth portions can be assigned.

5. The method of claim 1 wherein transmitting a bandwidth portion assignment comprises using a signalling scheme that supports only an indication of a contiguous set of the plurality of bandwidth portions.

6. The method of claim 1 wherein the plurality of bandwidth portions have equal bandwidth.

7. The method of claim 1 wherein the plurality of bandwidth portions have bandwidths that are associated with a selected pattern of a plurality of patterns, the method further comprising transmitting a pattern selection field to indicate the selected pattern.

8. The method of claim 1 further comprising:
transmitting a bandwidth portion selection field to select at least one bandwidth portion from the at least one bandwidth portion assigned to the numerology for use in a transmission to a UE.

9. The method of claim 8 further comprising:
transmitting a resource block allocation field to indicate an allocation of resource blocks or resource block groups within the selected at least one bandwidth portion.

10. The method of claim 8 further comprising:
transmitting a sub-band portion selection field to select at least one sub-band portion from a plurality of sub-band portions of the selected at least one bandwidth portion; and
transmitting a resource block allocation field to indicate an allocation of resource blocks or resource block groups within the selected at least one sub-band portion.

11. The method of claim 8 further comprising:
transmitting a sub-band portion selection field to select at least one sub-band portion from a plurality of sub-band portions of the selected at least one sub-band; and
transmitting a resource block allocation field to indicate an allocation of resource blocks or resource block groups within a specified bandwidth that is the selected at least one sub-band portion.

12. The method of claim 11 comprising using a first resource block allocation field for a first UE with a first payload, and using a second resource block allocation field for a second UE with a second payload, wherein the first resource block allocation field is smaller than the second resource block allocation field.

13. The method of claim 1 further comprising:
transmitting a sub-band selection field to select a sub-band assigned to a numerology for use in a transmission to a UE.

14. The method of claim 13 further comprising:
transmitting a resource block allocation field to indicate an allocation of resource blocks or resource block groups within the selected at least one sub-band.

15. The method of claim 14 wherein the sub-band portion selection field selects sub-band portions from a set of L sub-band portions of the at least one bandwidth portion assigned to the numerology, the L sub-band portions having equal bandwidth.

16. The method of claim 1 further comprising:
transmitting a sub-band portion selection field to select at least one sub-band portion from a plurality of sub-band portions of the at least one bandwidth portion assigned to a numerology; and
transmitting a resource block allocation field to indicate an allocation of resource blocks or resource block groups within the selected at least one sub-band portion.

17. A method comprising:
transmitting a sub-band portion selection field to select at least one sub-band portion from a plurality of sub-band portions of at least one bandwidth portion assigned to a first numerology, the first numerology having an associated first OFDM subcarrier spacing and first symbol duration, wherein a further at least one bandwidth portion is assigned to a second numerology, the second numerology having an associated second OFDM subcarrier spacing and second symbol duration, the first OFDM subcarrier spacing differing from the second OFDM subcarrier spacing by a factor of 2n, where n≠0; and
transmitting a resource block allocation field to indicate an allocation of resource blocks or resource block groups within the selected at least one sub-band portion.

18. An apparatus comprising:
a bandwidth portion assigner configured to transmit a bandwidth portion assignment to indicate an assignment of at least one first bandwidth portion of a plurality of bandwidth portions within an available bandwidth to a given first numerology, the given first numerology having an associated first OFDM subcarrier spacing and first symbol duration, the plurality of bandwidth portions having at least one second bandwidth portion that is assigned to a second numerology, the second numerology having an associated second OFDM subcarrier spacing and second symbol duration, and the first OFDM subcarrier spacing differing from the second OFDM subcarrier spacing by a factor of $2^n$, where n≠0.

19. An apparatus comprising:
a resource block allocator configured to transmit a sub-band portion selection field to select at least one sub-band portion from a plurality of sub-band portions of at least one bandwidth portion assigned to a first numerology, and to transmit a resource block allocation field to indicate an allocation of resource blocks or resource block groups within the selected at least one sub-band portion the first numerology having an associated first OFDM subcarrier spacing and first symbol duration, wherein a further at least one bandwidth portion is assigned to a second numerology, the second numerology having an associated second OFDM subcarrier spacing and second symbol duration, the first OFDM subcarrier spacing differing from the second OFDM subcarrier spacing by a factor of 2n, where n≠0.

* * * * *